(12) United States Patent
Miyama et al.

(10) Patent No.: US 11,978,357 B2
(45) Date of Patent: May 7, 2024

(54) ULCER MODEL USED TO PRACTICE PROCEDURE INCLUDING HEMORRHAGE ARREST

(71) Applicants: Denka Company Limited, Tokyo (JP); Tohoku University, Miyagi (JP)

(72) Inventors: Akira Miyama, Machida (JP); Toru Arai, Tokyo (JP); Takashi Sasaki, Machida (JP); Takeshi Kanno, Miyagi (JP); Yularo Arata, Miyagi (JP); Atsushi Masamune, Miyagi (JP)

(73) Assignees: Denka Company Limited, Tokyo (JP); Tohoku University, Miyagi (JP)

( * ) Notice: Subject to any disclaimer, the term of this patent is extended or adjusted under 35 U.S.C. 154(b) by 845 days.

(21) Appl. No.: 16/626,263

(22) PCT Filed: Jun. 28, 2018

(86) PCT No.: PCT/JP2018/024654
§ 371 (c)(1),
(2) Date: Dec. 23, 2019

(87) PCT Pub. No.: WO2019/004374
PCT Pub. Date: Jan. 3, 2019

(65) Prior Publication Data
US 2020/0160751 A1 May 21, 2020

(30) Foreign Application Priority Data
Jun. 28, 2017 (JP) ................. 2017-126352

(51) Int. Cl.
*G09B 23/28* (2006.01)
*G09B 9/00* (2006.01)
*G09B 23/30* (2006.01)

(52) U.S. Cl.
CPC ............ *G09B 23/285* (2013.01); *G09B 9/00* (2013.01); *G09B 23/30* (2013.01)

(58) Field of Classification Search
CPC ......... G09B 23/285; G09B 23/30; G09B 9/00
(Continued)

(56) References Cited

U.S. PATENT DOCUMENTS 6,863,536 B1 * 3/2005 Fisher ................. G09B 23/285
600/416
2005/0026125 A1 2/2005 Toly
(Continued)

FOREIGN PATENT DOCUMENTS

EP          2869286 B1 *  2/2018  .......... G09B 23/285
JP          S60-154979 U   8/1985
(Continued)

OTHER PUBLICATIONS

"Plasticizers," Wadey, B.L., Encyclopedia of Physical Science and Technology, Third Ed., pp. 441-456 (Year: 2001).*
(Continued)

*Primary Examiner* — Jay Trent Liddle
*Assistant Examiner* — Alyssa N Brandley
(74) *Attorney, Agent, or Firm* — Procopio, Cory, Hargreaves & Savitch LLP

(57) ABSTRACT

Disclosed is an ulcer model used to practice a procedure including hemorrhage arrest, the ulcer model including a model main body which includes upper and lower surfaces facing each other and a tubular simulated blood vessel path provided between the upper surface and the lower surface and having an inlet opening and an outlet opening. The upper surface includes a ring-shaped raised surface that rises in a thickness direction of the model main body and a simulated ulcer surface that is a recessed bottom surface surrounded by the raised surface. The simulated blood vessel
(Continued)

path extends from a part other than the upper surface of the surfaces of the model main body to the simulated ulcer surface or an area in the vicinity of the inside thereof.

12 Claims, 16 Drawing Sheets

(58) Field of Classification Search
USPC .......................................................... 434/272
See application file for complete search history.

(56) References Cited

U.S. PATENT DOCUMENTS

| | | | |
|---|---|---|---|
| 2009/0246747 A1* | 10/2009 | Buckman, Jr. ......... | G09B 23/30 434/272 |
| 2017/0032701 A1* | 2/2017 | Sekino ................... | G09B 23/30 |

FOREIGN PATENT DOCUMENTS

| | | |
|---|---|---|
| JP | 2006116206 A | 5/2006 |
| JP | 2008151895 A | 7/2008 |
| JP | 2008197483 A | 8/2008 |
| JP | 3184695 U | 7/2013 |
| JP | 2016224396 A | 12/2016 |
| WO | 2016077195 A1 | 5/2016 |

OTHER PUBLICATIONS

Extended European Search Report for related PCT App No. 18823760.6 dated Feb. 20, 2020, 6 pgs.
Office Action for related CN App No. 201880042642.4 dated Feb. 23, 2021, 6 pgs.
International Search Report for related PCT App No. PCT/JP2018/024654 dated Sep. 18, 2018, 1 pg.
International Preliminary Report on Patentability for related PCT App No. PCT/JP2018/024654 dated Jan. 9, 2020, 6 pgs.

* cited by examiner

ULCER MODEL USED TO PRACTICE PROCEDURE INCLUDING HEMORRHAGE ARREST

CROSS-REFERENCE TO RELATED APPLICATIONS

This application is a U.S. National Stage entry of PCT Application No. PCT/JP2018/024654 filed Jun. 28, 2018, which claims priority to Japanese Patent Application No. 2017-126352, filed Jun. 28, 2017, the contents of which are incorporated herein by reference.

TECHNICAL FIELD

The present invention relates to an ulcer model used to practice a procedure including hemorrhage arrest, for example, a procedure of an endoscopic hemostasis by physicians or medical students.

BACKGROUND ART

In recent years, expectation for a minimally invasive surgery in which a burden to human bodies is small and speedy recovery can be expected is increasing, and cases thereof is increasing. For example, by endoscopically arresting hemorrhage in a gastrointestinal tract, shock from hemorrhage can be prevented and saving a life can be carried out while avoiding an emergency surgery. By avoiding an emergency surgery, a physical burden to a patient is relieved, and a period of hospitalization is shortened so that early social rehabilitation is expected. Even in the case of a slight degree of bleeding, by early arrest of the bleeding, a risk of re-bleeding can be reduced. Even in a case where bleeding does not occur, hemorrhage in a visible vessel in which hemorrhage is anticipated is prophylactically arrested in some eases. Therefore, a demand for a model for practicing a procedure by a physician in response to a surgery accompanied with hemorrhage arrest is increasing.

Hitherto, models which can be used for practicing endoscopic mucosal resection (EMR) and endoscopic submucosal dissection (ESD) have been proposed (Patent Literatures 1 and 2), but these models are not used for practicing a hemostatic technique for arresting hemorrhage from a vessel opening.

CITATION LIST

Patent Literature

Patent Literature 1: Japanese Unexamined Patent Publication No. 2006-116206
Patent Literature 2: Japanese Unexamined Patent Publication No. 2008-197483

SUMMARY OF INVENTION

Technical Problem

A simple ulcer model included with a large-size upper gastrointestinal tract model or lower gastrointestinal tract model of a related art is used for endoscopic observation, but cannot be used for practicing a procedure of hemorrhage arrest or the like.

In this regard, a main object of the present invention is to provide an ulcer model that enables a practice of a procedure including hemorrhage arrest.

Solution to Problem

In order to solve the above-described problems, the present invention provides the following.

[1.] An ulcer model used to practice a procedure including hemorrhage arrest, the ulcer model including a model main body which includes an upper surface and a lower surface facing each other and a tubular simulated blood vessel path (also referred to as a simulated blood path) provided between the upper surface and the lower surface and having an inlet opening and an outlet opening, in which the upper surface includes a ring-shaped raised surface that rises in a thickness direction of the model main body and a simulated ulcer surface that is a recessed bottom surface surrounded by the raised surface, and the simulated blood vessel, path extends from a part other than the upper surface of the surfaces of the model main body to the simulated ulcer surface or an area in the vicinity of the inside thereof.

[2] The ulcer model described in [1], in which the procedure including hemorrhage arrest is an endoscopic hemostasis.

[3] The ulcer model described in [1] or [2], in which the hemorrhage arrest is hemorrhage arrest by gripping the simulated ulcer surface with a hemostatic forceps or a clip.

[4] The ulcer model described in [1] or [2], in which the hemorrhage arrest is hemorrhage arrest of the simulated ulcer surface by a thermocoagulation method.

[5] The ulcer model described in any one of [1] to [4], in which the model main body includes a molded body having an E hardness of 5 to 70.

[6] The ulcer model described in any one of [1] to [5], in which the model main body includes a molded body of an aqueous polyvinyl alcohol-based material.

[7] The ulcer model described in any one of [1] to [5], in which the model main body includes a molded body of a hydrocarbon-based resin material containing a lipophilic resin and oil.

[8] The ulcer model described in any one of [1] to [5], in which the model main body includes a molded body of an aqueous polyvinyl alcohol-based material which forms at least a part of the simulated ulcer surface and a molded body of a hydrocarbon-based resin material containing a lipophilic resin and oil.

Advantageous Effects of Invention

By using the ulcer model according to the present invention, the procedure including hemorrhage arrest can be practiced. For example, by attaching the ulcer model of the present invention to an arbitrary position of a wall of an upper gastrointestinal tract (stomach, esophagus, intestine duodenum) or lower gastrointestinal tract (small intestine, large intestine) model, a trainer can practice the procedure of hemorrhage arrest while endoscopically observing the ulcer model. In addition, by changing the number of the simulated blood vessel paths or the form thereof, it is possible to provide ulcer models for practicing various procedures corresponding to types of ulcer.

DESCRIPTION OF EMBODIMENTS

Hereinafter, embodiments of the present invention will be described in detail with reference to drawings as appropriate. However, the present invention is not limited to the following embodiments.

Figure 1:
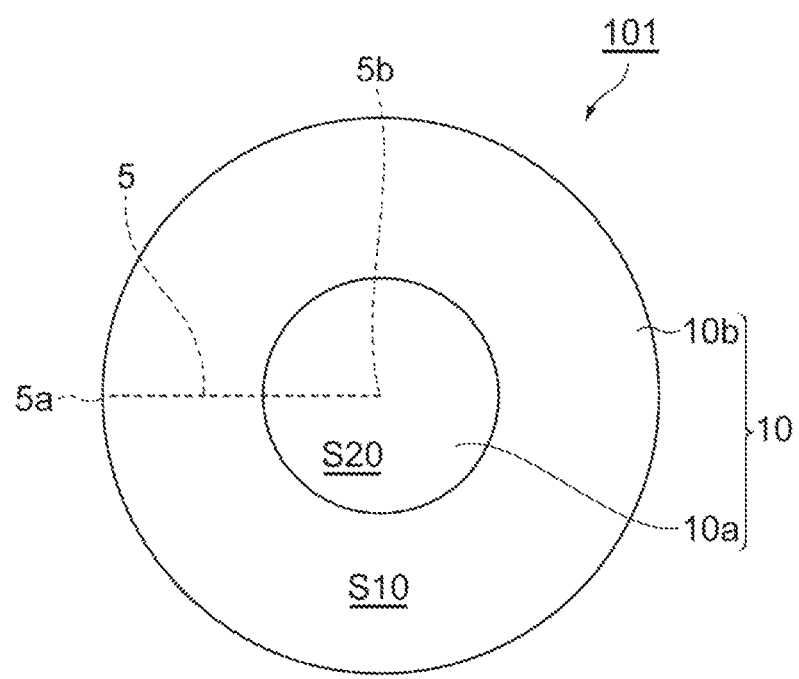
FIG. 1 is a top view illustrating an embodiment of an ulcer model.
Figure 2:
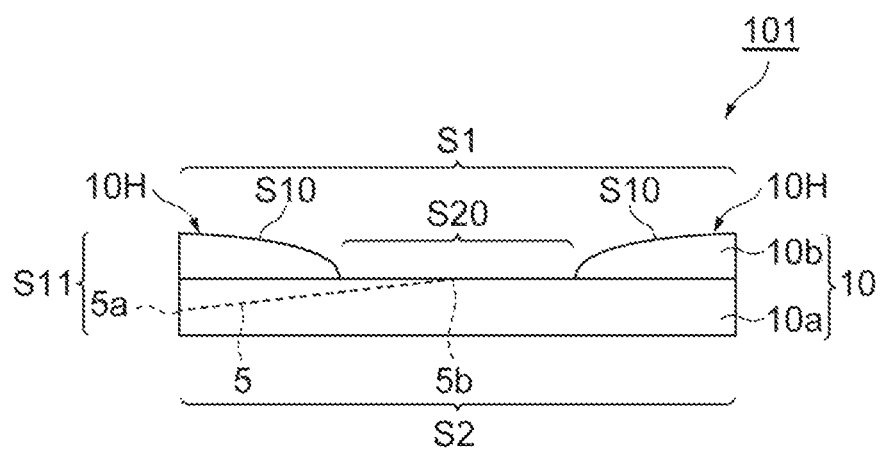
FIG. 2 is a front view illustrating the embodiment of the ulcer model.
Figure 3:
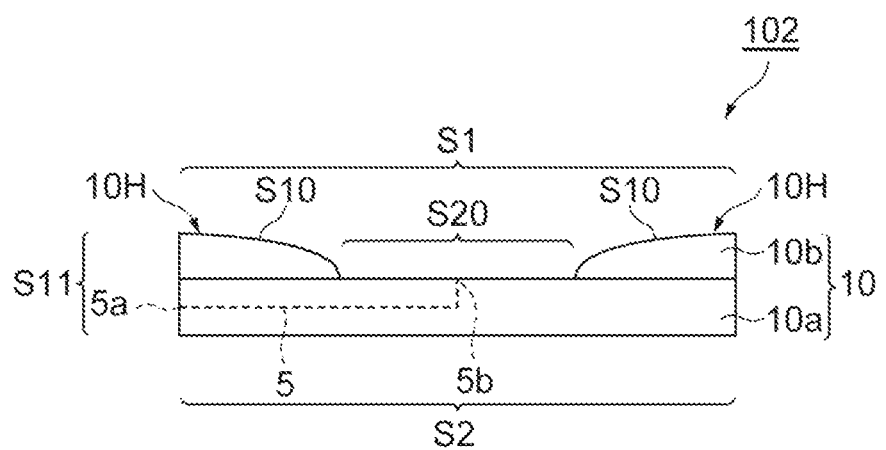
FIG. 3 is a front view illustrating an embodiment of an ulcer model.

FIG. 1 is a top view illustrating an embodiment of an ulcer model, and FIG. 2 is a front view of the ulcer model 101 of FIG. 1. The ulcer model 101 illustrated in FIG. 1 and FIG. 2 is provided with a model main body 10 which includes substantially circular upper and lower surfaces S1 and S2, an outer peripheral side surface S11 continuously connecting outer edges of the upper surface S1 and the lower surface S2, and a tubular simulated blood vessel path 5 provided between the upper surface S1 and the lower surface S2 and having an inlet opening 5a and an outlet opening 5b. The upper surface S1 includes a ring-shaped raised surface S10 that rises in a thickness direction of the model main body 10 and a simulated ulcer surface S20 that is a recessed bottom surface surrounded by the raised surface S10. Herein, the shape of the ring-shaped raised surface S10 may be a shape along a circular shape when viewed from the upper surface S1 side as illustrated in FIG. 1, but the shape thereof is not particularly limited as long as it is a shape surrounding the simulated ulcer surface S20. For example, when the raised surface S10 is viewed from the upper surface S1 side, the outer periphery and the inner periphery of the raised surface S10 each independently can have an arbitrary shape selected from a circular shape, an elliptical shape, a polygonal shape, and an indefinite shape. Similarly, when the simulated ulcer surface S20 is viewed from the upper surface S1 side, the outer periphery of the simulated ulcer surface S20 can have, for example, an arbitrary shape selected from a circular shape, an elliptical shape, a polygonal shape, and an indefinite shape. The simulated blood vessel path 5 linearly extends inside of the model main body 10 from the outer peripheral side surface S11 of the model main body 10 to the simulated ulcer surface S20 toward a position at which the outlet opening 5b is positioned on the simulated ulcer surface S20 side. The simulated blood vessel path 5 may be curved at one or more places as in an ulcer model 102 illustrated in FIG. 3.

The model main body 10 in the embodiment of FIG. 1 is configured by a plate-shaped base portion 10a including the simulated ulcer surface S20 and a raised portion 10b provided on the base portion 10a and forming the raised surface S10. The base portion 10a and the raised portion 10b can be molded bodies of the same molding material or different molding materials. The properties, such as a hardness, of the base portion 10a and the raised portion 10b can be selected depending on types of the gastrointestinal tract to be simulated, and the like. For example, the hardness of the molded body forming the raised portion 10b may be the same as or lower than the hardness of the molded body forming the base portion 10a.

The maximum width of the model main body 10 in a direction perpendicular to the thickness direction of the model main body 10 is sufficient to be in a range corresponding to the spreading of a general ulcer, and may be, for example, in a range of 10 to 150 mm.

The simulated ulcer surface S20 is typically a flat surface positioned at the center of the upper surface S1. However, the simulated ulcer surface S20 may include a minute projection as described later. The simulated ulcer surface S20 is a portion which simulates an ulcer site in which a portion corresponding to a submucosal layer is exposed by missing a mucosal layer, and corresponds to the recessed bottom surface in the upper surface S1. The maximum width of the simulated ulcer surface S20 may be, for example, in a range of 3 to 100 mm.

The raised surface S10 includes a portion at which the thickness of the model main body 10 is maximum, as an apex 10H. The thickness of the model main body 10 in the apex 10H (that is, the maximum thickness of the model main body 10) is not particularly limited, but may be about 1 to 30 mm or about 2 to 20 mm.

A difference between the thickness of the model main body 10 at the position of the apex 10H and the thickness of the model main body 10 in the simulated ulcer surface S20 (a difference in height between the apex 10H of the raised surface S10 and the simulated ulcer surface S20) is arbitrary, but may be in a range of approximately 10 to 90% with respect to the thickness of the model main body 10 in the apex 10H.

The simulated blood vessel path 5 is a simulated blood vessel for supplying simulated blood to the simulated ulcer surface S20 on the occasion of the practice of hemorrhage arrest. The simulated blood vessel path 5 may be a hole passing through the model main body 10, a tube provided separately from the model main body 10 and embedded in the model main body 10, or a combination thereof. In particular, when the simulated blood vessel path 5 at the outlet opening 5b and a portion in the vicinity thereof is not a tube but a hole formed by the model main body 10, the hemorrhage arrest procedure by a mechanical method or a thermocoagulation method can be practiced while an actual procedure is satisfactorily replicated. Meanwhile, from the viewpoint of easily maintaining the structure of a hole even when the model main body 10 is soft, at least a part of the simulated blood vessel path 5 may be a tube.

In a case where the simulated blood vessel path 5 is a tube, the tube may protrude to the outside of the model main body 10 at the inlet opening 5a side. The tube as the simulated blood vessel path 5 may be a soft material, for example, an elastomer tube having an A hardness (measured according to JIS K 6253) of 70 or less. Specific examples thereof include tubes of polytetrafluoroethylene, polyvinyl chloride, polyurethane, silicone, polyolefin-based elastomer, and polystyrene-based elastomer.

The outlet opening 5b of the simulated blood vessel path 5 may be disposed in the vicinity of the inside of the simulated ulcer surface S20 without reaching to the simulated ulcer surface S20. Even if the outlet opening 5b does not reach to the simulated ulcer surface S20, the simulated blood vessel path 5 can be easily communicated with the simulated ulcer surface S20 by a method such as excising a part in the vicinity of the outlet opening 5b, inserting a needle, or pinching with tweezers or the like before the procedure practice. The outlet opening 5b may be disposed, for example, at a position with a depth of about 0.1 to 5 mm from the simulated ulcer surface S20.

Figure 4:
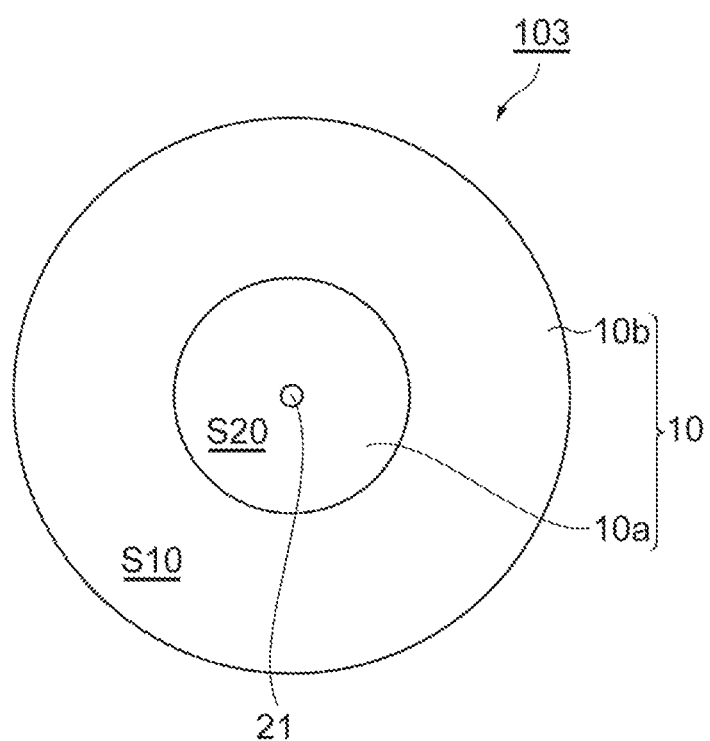
FIG. 4 is a top view illustrating an embodiment of an ulcer model.
Figure 5:
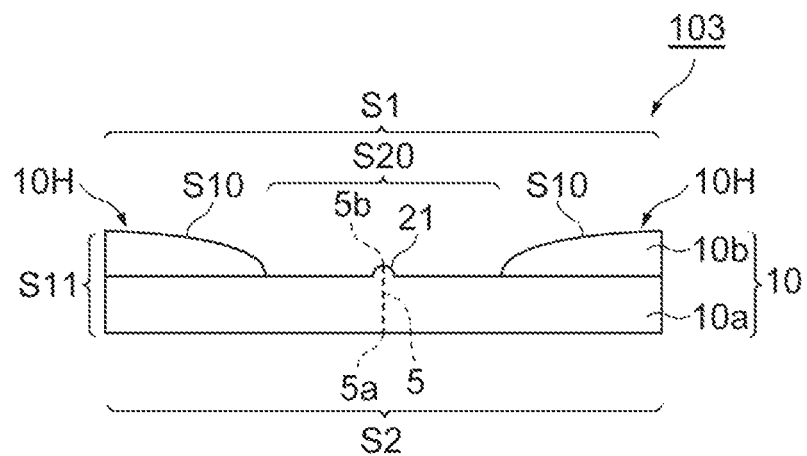
FIG. 5 is a front view illustrating the embodiment of the ulcer model.

FIG. 4 is also a top view illustrating an embodiment of an ulcer model, and FIG. 5 is a front view of the ulcer model 103 of FIG. 4. In the ulcer model 103 illustrated in FIG. 4 and FIG. 5, the simulated ulcer surface S20 has a projection 21 and the outlet opening 5b of the simulated blood vessel path 5 is disposed at the tip end of the projection 21 or in the vicinity thereof. The height of the projection 21 is, for example, about 0.1 to 10 mm.

In the ulcer model 103, the inlet opening 5a of the simulated blood vessel path 5 is disposed in the lower surface S2 and the simulated blood vessel path 5 extends from the lower surface S2 to the simulated ulcer surface S20. In this way, the simulated blood vessel path 5 may extend from a portion other than the upper surface S1 of the surfaces of the model main body 10 to the simulated ulcer surface S20 or the vicinity of the inside thereof, and for example, the inlet opening 5a may be provided in the outer peripheral side surface S11 of the model main body 10, the lower surface S2, or the vicinity thereof.

Figure 6:
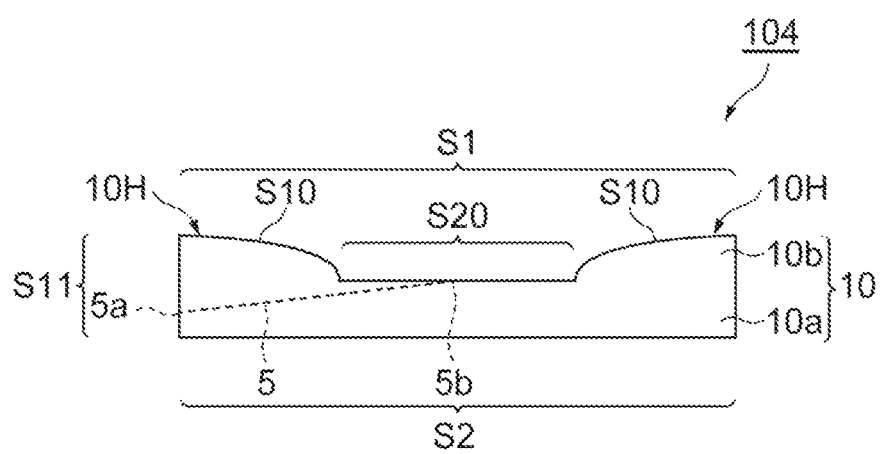
FIG. 6 is a front view illustrating an embodiment of an ulcer model.
Figure 7:
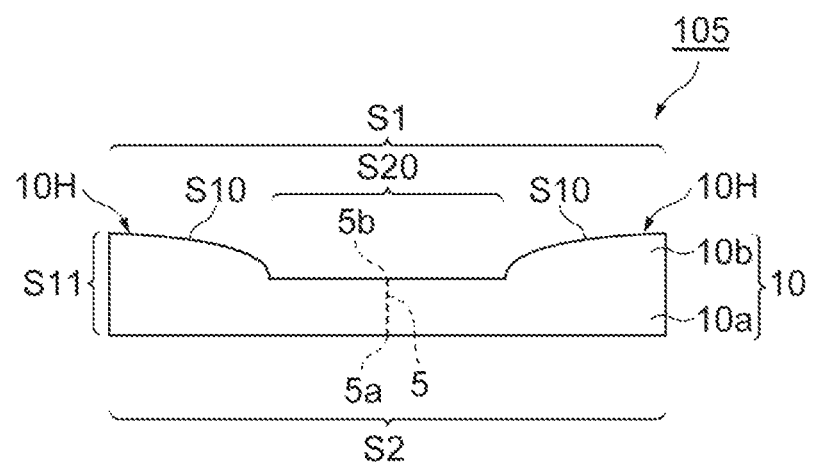
FIG. 7 is a front view illustrating an embodiment of an ulcer model.

As in an ulcer model 104 illustrated in FIG. 6 and an ulcer model 105 illustrated in FIG. 7, the base portion 10a and the raised portion 10b may be a molded body integrally formed by the same molding material.

Figure 8:
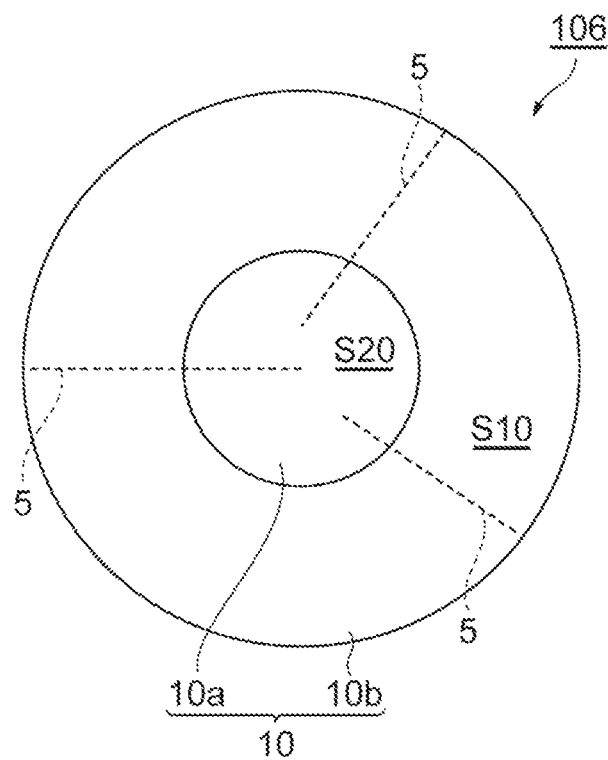
FIG. 8 is a top view illustrating an embodiment of an ulcer model.
Figure 9:
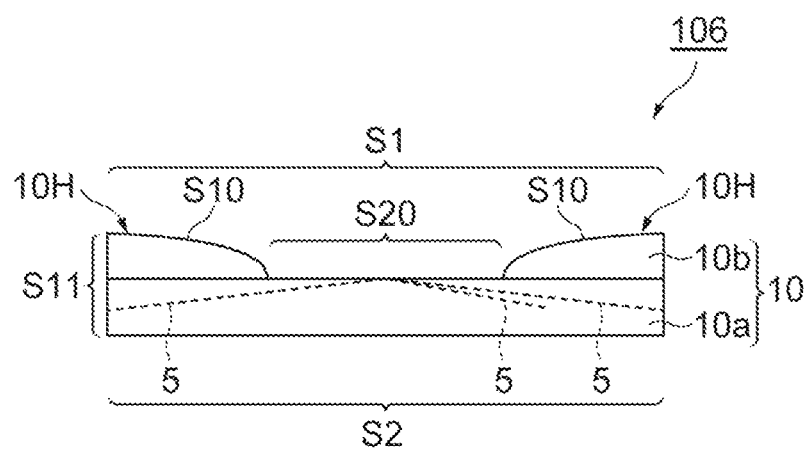
FIG. 9 is a front view illustrating the embodiment of the ulcer model.

FIG. 8 is also a top view illustrating an embodiment of an ulcer model, and FIG. 9 is a front view of the ulcer model 106 of FIG. 8. The ulcer model 106 illustrated in FIG. 8 and FIG. 9 has a plurality of simulated blood vessel paths 5 embedded in the model main body 10, and each of the simulated blood vessel paths 5 extends from the outer peripheral side surface S11 of the model main body 10 to the simulated ulcer surface S20. The number of the simulated blood vessel paths 5 provided in the model main body 10 may be, for example, one to five.

Figure 10:
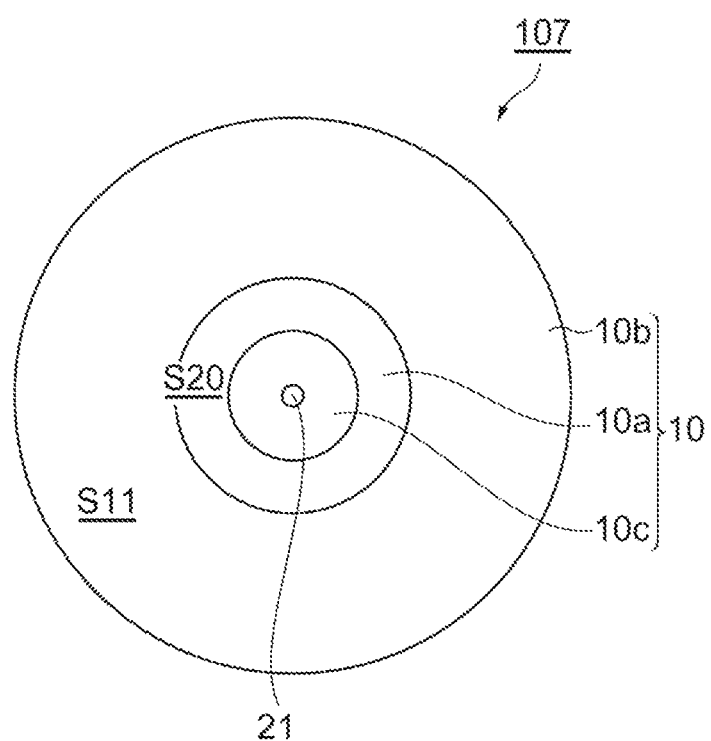
FIG. 10 is a top view illustrating an embodiment of an ulcer model.
Figure 11:
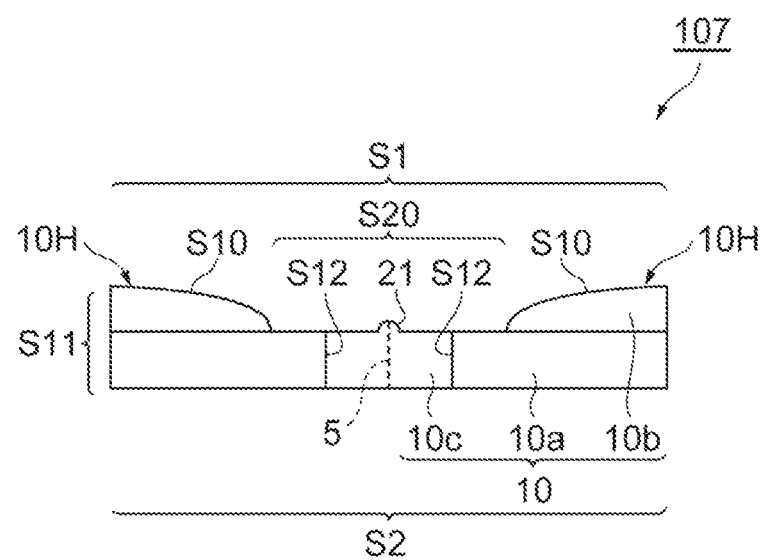
FIG. 11 is a front view illustrating the embodiment of the ulcer model.

FIG. 10 is also a top view illustrating an embodiment of an ulcer model, and FIG. 11 is a front view of the ulcer model 107 of FIG. 10. In the ulcer model 107 illustrated in FIG. 10 and FIG. 11, the model main body 10 has a simulated ulcer portion 10c provided separately from the base portion 10a and the raised portion 10b. The base portion 10a of the ulcer model 107 is a ring-shaped body having the outer peripheral side surface S11 and an inner peripheral side surface S12, and the simulated ulcer portion 10c is fitted to a through hole formed by the inner peripheral side surface S12 of the base portion 10a. In the part of the simulated ulcer portion 10c, the simulated ulcer surface S20 forms the projection 21, and the simulated blood vessel path 5 extends in the simulated ulcer portion 10c from the lower surface S2 to the projection 21 of the upper surface S1 or the vicinity thereof. The simulated ulcer portion 10c is generally a molded body formed by a molding material different from those of the base portion 10a and the raised portion 10b.

Since each ulcer model illustrated in FIG. 1 to FIG. 11 has the outer peripheral side surface, the ulcer model is mainly assumed to be fitted to an organ model having an appropriate model attachment portion. The model attachment portion can be, for example, a frame formed by missing a part of a wall of the organ model.

Figure 12:
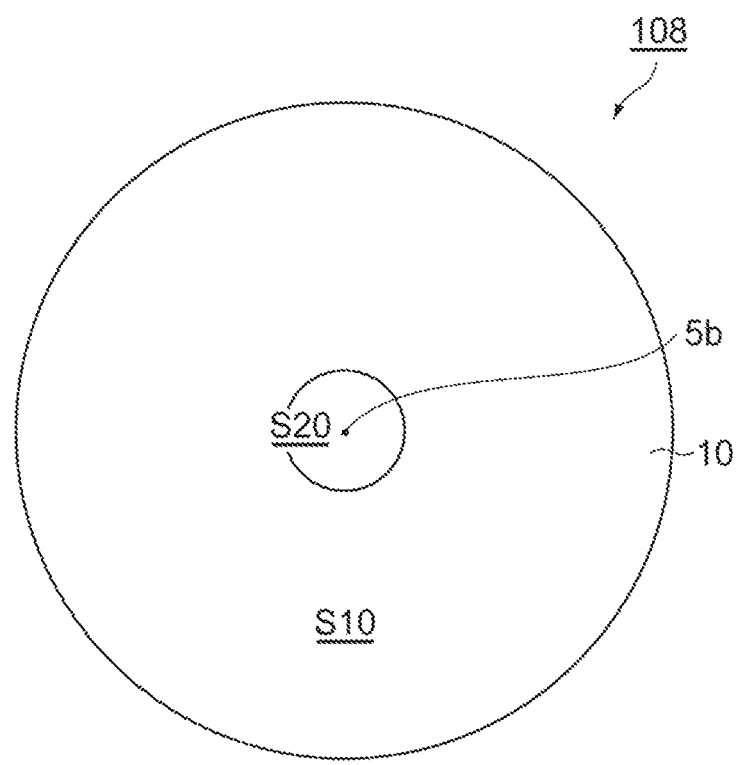
FIG. 12 is a top view illustrating an embodiment of an ulcer model.
Figure 13:
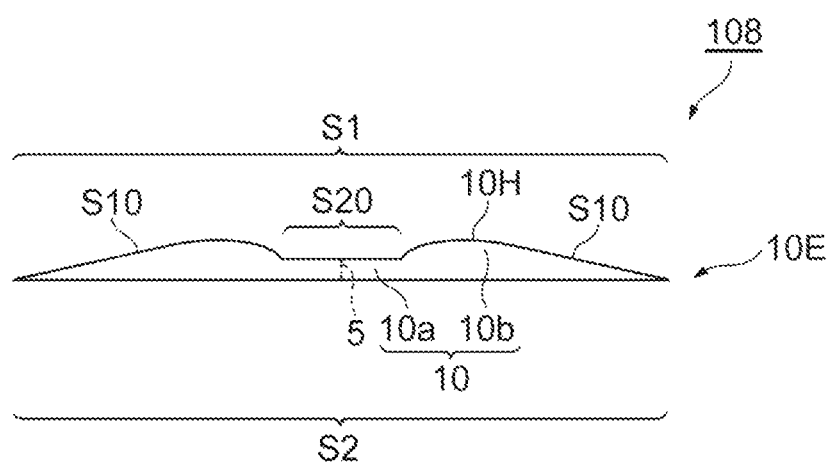
FIG. 13 is a front view illustrating the embodiment of the ulcer model.

FIG. 12 is also a top view illustrating an embodiment of an ulcer model, and FIG. 13 is a front view of the ulcer model 108 of FIG. 12. In the ulcer model 108 illustrated in FIG. 12 and FIG. 13, the raised surface S10 is inclined to the flat lower surface S2 such that the thickness thereof gradually decreases from the apex 10H thereof to outer edges 10E. The upper surface S1 and the lower surface S2 are connected directly (not via the outer peripheral side surface) in the outer edges 10E. Since the ulcer model in the form in which the raised surface is inclined such that the thickness thereof gradually decreases from the apex thereof to the outer edge, as in the ulcer model 108, hardly forms a level difference with the peripheral portion of the ulcer model when the ulcer model is attached to an organ model, such an ulcer model is particularly suitable for attachment to the inner wall of the organ model.

The model main body in the ulcer model exemplified above is generally configured by a molded body of a soft resin. The hardness of this molded body of the soft resin may be appropriately selected depending on types of gastrointestinal tract and ulcer to be simulated, but for example, the E hardness (measured according to JIS K 6253) of the molded body of the soft resin may be in a range of 5 to 70. More specifically, the E hardness of the molded body forming the raised portion 10b (for example, the raised portion 10b in the ulcer model 101, 102, 103, 106, or 107, or the model main body 10 in the ulcer model 104, 105, or 108) may be 5 to 30. The E hardness of the molded body, which forms the outlet opening 5b of the simulated blood vessel path 5 or a portion including a directly upper portion of the outlet opening, of the simulated ulcer surface S20 (for example, the base portion 10a in the ulcer model 101, 102, 103, or 106, the model main body 10 in the ulcer model 104, 105, or 108, or the simulated ulcer portion 10c in the ulcer model 107) may be 20 to 70. When comparison is carried out in the same model, the molded body forming the raised portion 10b may have a hardness lower than the hardness of the molded body, which forms the outlet opening 5b of the simulated blood vessel path 5 or a portion including a directly upper portion of the outlet opening, of the simulated ulcer surface S20.

A soft resin for forming a molded body having an E hardness in the above-described range may be, for example, an aqueous polyvinyl alcohol-based material containing polyvinyl alcohol and water or a hydrocarbon-based resin material containing a lipophilic resin and oil. The E hardness of the molded body can be appropriately adjusted, for example, by the amount of water in the aqueous polyvinyl alcohol-based material and the amount of oil in the hydrocarbon-based resin material.

The aqueous polyvinyl alcohol-based material may be a gel (aqueous polyvinyl alcohol gel) containing a crosslinked body of polyvinyl alcohol and water, and for example, can be a material selected from materials described in Japanese Unexamined Patent Publication No. 2011-076035, Japanese Unexamined Patent Publication No. 2010-277003, Japanese Unexamined Patent Publication No. 2010-197637, Japanese Unexamined Patent Publication No. 2010-204131, Japanese Unexamined Patent Publication No. 2011-075907, Japanese Unexamined Patent Publication No. 2011-008213, or Japanese Unexamined Patent Publication No. 2010-156894. The aqueous polyvinyl alcohol-based material can have hardness, dynamic physical properties, elasticity, and tactile sensation which are similar to organs.

The aqueous polyvinyl alcohol-based material (or the aqueous polyvinyl alcohol gel) may further contain silica fine particles such as silica sol. The aqueous polyvinyl alcohol-based material containing silica fine particles can exhibit properties extremely similar to organ tissues in terms of tactile sensation, sensation at the time of clip-fixing, and thermocoagulation behavior. In particular, regarding hemorrhage arrest accompanied by heating with an electrocautery, the hemostatic behavior extremely similar to human tissues is expressed.

The lipophilic resin constituting the hydrocarbon-based resin material can be a curable resin or a thermoplastic resin. Examples of the curable resin include two-pack type soft urethane resins. Examples of the thermoplastic resin include a vinyl chloride resin, an aromatic vinyl-conjugated diene-based block copolymer, and a hydrogenated product thereof. In particular, the aromatic vinyl-conjugated diene-based block copolymer and a hydrogenated product thereof can form an ultra-soft molded body having an E hardness of 50 or less by combination with oil.

The aromatic vinyl-conjugated diene-based block copolymer has an aromatic vinyl block unit (X) derived from aromatic vinyl and a conjugated diene block unit (Y) derived from conjugated diene. In the aromatic vinyl-conjugated diene-based block copolymer, generally, the aromatic vinyl block unit (X) as a hard segment forms pseudo-crosslinking (domain) bridging the conjugated diene rubber block unit (Y) as a soft segment.

Examples of the aromatic vinyl forming the aromatic vinyl block unit (X) include styrene, α-methylstyrene, 3-methylstyrene, p-methylstyrene, 4-propylstyrene, 4-dodecylstyrene, 4-cyclohexylstyrene, 2-ethyl-4-benzylstyrene, 4-(phenylbutyl)styrene, 1-vinylnaphthalene, 2-vinylnaphthalene, and combinations thereof. Among these, aromatic vinyl may be styrene.

Examples of the conjugated diene forming the conjugated diene block unit (Y) include butadiene, isoprene, pentadiene, 2,3-dimethylbutadiene, and combinations thereof. Among these, the conjugated diene may be butadiene, isoprene, or a combination of butadiene and isoprene (a butadiene-isoprene copolymer). The butadiene-isoprene copolymer may be any of a random copolymer unit of butadiene and isoprene, a block copolymer unit thereof, and a tapered copolymer unit thereof.

The form of the aromatic vinyl-conjugated diene block copolymer is represented, for example, by formula: $X(YX)_n$ or $(XY)_n$ (n represents an integer of 1 or more). Among these, the aromatic vinyl-conjugated diene block copolymer may be a copolymer in the form of $X(YX)_n$, particularly, a copolymer in the form of X—Y—X. Examples of the copolymer in the form of X—Y—X include a polystyrene-polybutadiene-polystyrene block copolymer, a polystyrene-polyisoprene-polystyrene block copolymer, and a polystyrene-polyisoprene/butadiene-polystyrene block copolymer. In the soft resin constituting the model main body, the aromatic vinyl-conjugated diene-based block copolymer may be one or more kinds selected from the group consisting of those copolymers.

The content of the aromatic vinyl block unit (X) in the aromatic vinyl-conjugated diene block copolymer may be 5% by mass or more and 50% by mass or less, or 20% by mass or more and 40% by weight or less based on the total mass of the aromatic vinyl-conjugated diene block copolymer. The content of the aromatic vinyl block unit (X) can be measured by a normal method such as infrared spectroscopy or NMR spectroscopy.

The aromatic vinyl-conjugated diene block copolymer as described above can be produced by various methods. Examples of the production methods may include (1) a method of consecutively polymerizing aromatic vinyl and then a conjugated diene using an alkyl lithium compound such as n-butyl lithium as an initiator, (2) a method of polymerizing aromatic vinyl and then a conjugated diene and coupling the same by a coupling agent, and (3) a method of consecutively polymerizing a conjugated diene and then aromatic vinyl using a lithium compound as an initiator.

The hydrogenated product of the aromatic vinyl-conjugated diene-based block copolymer is a copolymer generated by hydrogenating the aromatic vinyl-conjugated diene block copolymer as described above by a known method. The hydrogenation rate may be 90 mol % or more. The hydrogenation rate can be measured by a known method such as nuclear magnetic resonance (NMR) spectroscopy.

Examples of the hydrogenated product of the aromatic vinyl-conjugated diene-based block copolymer include a polystyrene-polyethylene/propylene) block copolymer (SEP), a polystyrene-poly(ethylene/propylene) block-polystyrene copolymer (SEPS), a polystyrene-poly(ethylene/butylene) block-polystyrene copolymer (SEBS), and a polystyrene-poly(ethylene-ethylene/propylene) block-polystyrene copolymer (SEEPS). Examples of commercially available products of the hydrogenated product of the aromatic vinyl-conjugated diene-based block copolymer include SEPTON (manufactured by Kuraray Co., Ltd.), Kraton (manufactured by Shell Chemicals), Kraton G (manufactured by Shell Chemicals), and TUFTEC (manufactured by Asahi Kasei Corp.) (all of the above are product names). The hydrogenated product of the aromatic vinyl-conjugated diene-based block copolymer may be SEEPS.

The melt flow rate (MFR (temperature: 230° C., load: 2.16 kg)) of the aromatic vinyl-conjugated diene-based block copolymer and the hydrogenated product thereof may be 1 g/10 min or less or less than 0.1 g/10 min. The MFR (temperature: 230° C., load: 2.16 kg) described herein is measured according to JIS K7210 under the conditions of a temperature of 230° C. and a load of 2.16 kg. The MFR within the above-described range is advantageous in terms of suppression of bleeding-out of oil and an appropriate mechanical strength.

The shapes of the aromatic vinyl-conjugated diene-based block copolymer and the hydrogenated product thereof may be a powder or an amorphous (crumb) form from the viewpoint of oil absorption work before kneading.

The oil constituting the hydrocarbon-based resin material with the lipophilic resin exemplified above is used for softening the hydrocarbon-based resin material to adjust an elastic modulus and a hardness to ranges suitable for the ulcer model. Examples of the oil include mineral oil-based oils such as paraffinic process oil, naphthenic process oil, aromatic process oil, and liquid paraffin, silicone silicon oil, castor oil, linseed oil, olefinic wax, and mineral wax. Oils described in Japanese Unexamined Patent Publication No. 2015-229760 may be used. Moreover, various ester-based plasticizers such as phthalic acid-based, trimellitic acid-based, pyromellitic acid-based, adipic acid-based, and citric acid-based plasticizers can also be used as oil. These may be used singly or in combination of a plurality of kinds thereof. Among these, the oil may be paraffinic process oil, naphthenic process oil, or a combination thereof. Examples of commercially available products of the process oil include Diana Process Oil Series (manufactured by Idemitsu Kosan Co., Ltd.) and JOMO Process P (manufactured by Japan Energy Corporation).

Among these, one or more of oils can also be used in combination.

From the viewpoint of workability, the oil may be absorbed in a pellet or crumb of the lipophilic resin.

The amount of the oil is adjusted according to a site of the gastrointestinal tract to be simulated, types of ulcer, and the like. For example, the amount of the oil may be 100 parts by mass or more and 2000 parts by mass or less or 1600 parts by mass or less with respect to 100 parts by mass of the lipophilic resin (for example, the aromatic vinyl-conjugated diene-based block copolymer). When the amount of the oil is small, softness may be insufficient, and when the amount of the oil is excessively large, mixing with the lipophilic resin may be difficult or bleeding-out of the oil may occur.

In order to suppress bleeding-out of the oil or adjust dynamic physical properties, the hydrocarbon-based resin material may contain, for example, a polyolefin-based crystalline resin, particularly, a polyethylene-based crystalline resin, and may contain an inorganic filler such as calcium carbonate or an organic or inorganic fibrous filler.

Figure 14:
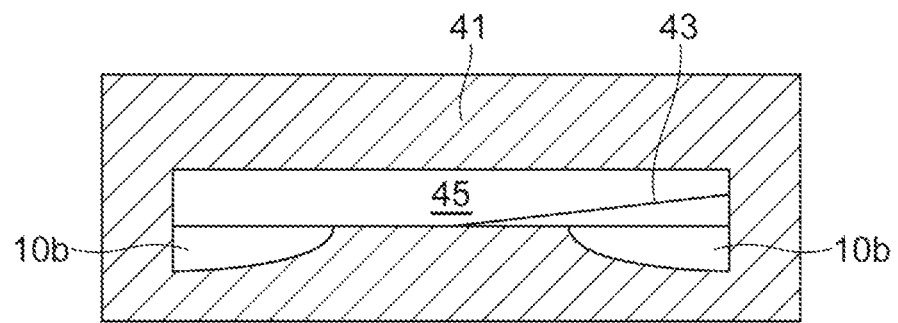
FIG. 14 is a schematic diagram illustrating an embodiment of a method for producing an ulcer model.

The ulcer model according to this embodiment can be produced by a typical molding method. For example, the ulcer model 101 of FIG. 1 and FIG. 2 can be produced by a method including: setting the molded body of the raised portion 10b molded in advance and a wire 43 in a cavity 45 of a mold 41 having a shape corresponding to the model main body 10 to mold the base portion 10a, and removing the wire 43 thereafter to form the simulated blood vessel path 5, as illustrated in FIG. 14. The wire 43 may be made of a metal or a resin. A tube may be used instead of the wire and may be used without any changes as the simulated blood vessel path. Alternatively, a wire or the like may be inserted in the molded model main body and a hole as the simulated blood vessel path may be formed.

The molded body of the aqueous polyvinyl alcohol-based material can be formed, for example, by a method of pouring a molding composition containing polyvinyl alcohol, a cross-linking agent (boric acid or the like), and water in a mold and then gelling the composition or a method of pouring the same molding composition in a mold and then accelerating gelation by repeating freezing the composition by cooling to a melting point or lower and dissolving the composition by heating to a melting point or higher. The molded body of the hydrocarbon-based resin material can be formed, for example, by a molding method such as casting, vacuum molding, or injection molding including multicolor molding.

The embodiment of the ulcer model is not limited to the embodiment described above, and can be appropriately changed. For example, the shapes of the upper surface and the lower surface of the model main body are not limited to a circular shape, and may be an elliptical shape or a rectangular shape (for example, a square shape).

Figure 15:
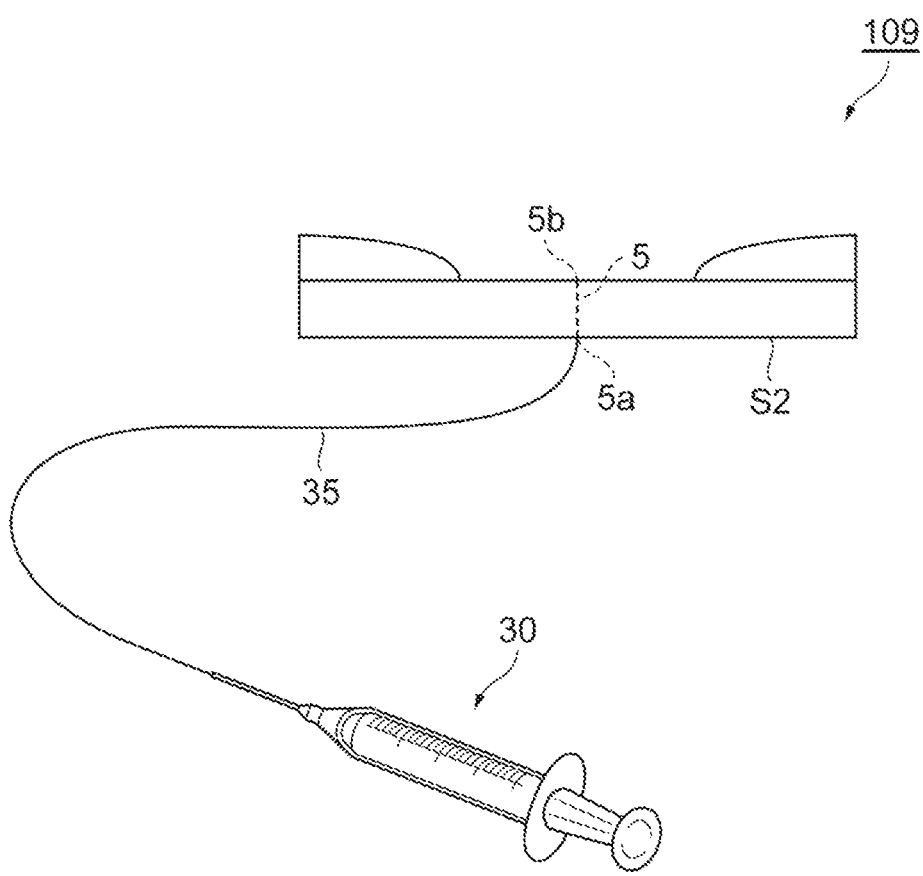
FIG. 15 is a schematic diagram illustrating an example of a method of using an ulcer model.
Figure 16:
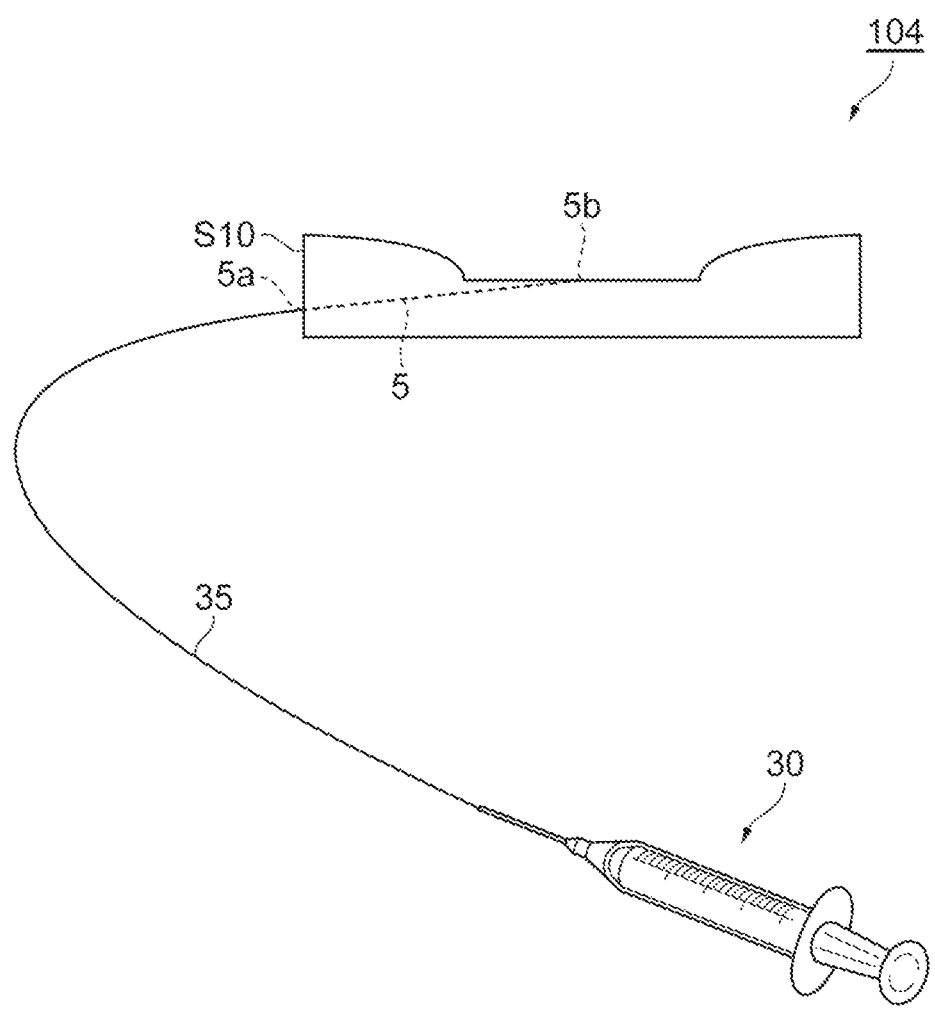
FIG. 16 is a schematic diagram illustrating an example of a method of using an ulcer model.

The ulcer model of this embodiment is used to practice a procedure including hemorrhage arrest. FIG. 15 and FIG. 16 are schematic diagrams illustrating examples of methods of using ulcer models 109 and 104, respectively. The inlet opening 5a of the simulated blood vessel path 5 is disposed in the outer peripheral side surface in the ulcer model 109 of FIG. 15 and is disposed in the lower surface S2 in the ulcer model 104 of FIG. 16. As illustrated in these drawings, a syringe 30 filled with simulated blood is connected to the inlet opening 5a of the simulated blood vessel path 5 via a tube 35, and the simulated blood is supplied to the simulated ulcer surface S20 through the simulated blood vessel path 5 from the syringe 30. An arbitrary tool or equipment capable of allowing simulated blood to flow, for example, a tubular pump or a syringe pump may be used instead of the syringe.

The ulcer model is mounted on an arbitrary organ model, for example, on an upper gastrointestinal tract (stomach, esophagus, intestine duodenum) or lower gastrointestinal tract (small intestine, large intestine) model and then used to practice an endoscopic hemostatsis. The ulcer model may be fitted to a model attachment portion provided in the gastrointestinal tract model or the ulcer model may be attached to the inner wall of the gastrointestinal tract model. The model attachment portion of the gastrointestinal tract model may be a frame or recess formed by missing a part of the wall or a tool for mounting a model may be attached to the inner wall of the gastrointestinal tract model. The ulcer model can be attached to the inner wall using an adhesive, a pressure-sensitive adhesive, or double-sided tape.

On the occasion of the practice of an endoscopic hemostasis, a trainer first endoscopically checks an ulcer site and observes an ulcer model. Further, the simulated blood is caused to flow out from the outlet opening 5b of the simulated blood vessel path 5. If necessary, the simulated ulcer surface is washed or a simulated gelosis separately prepared is removed, and then the trainer starts a procedure including hemorrhage arrest.

As examples of types of the endoscopic hemostasis which can be practiced, there are a mechanical method typified by a method of gripping a visible vessel with hemorrhage with a clip and various thermocoagulation methods including gripping hemorrhage arrest with a hemostatic forceps. That is, it is possible to practice an endoscopic hemostasis including hemorrhage arrest by gripping the simulated ulcer surface with a hemostatic forceps or a clip.

As the thermocoagulation method, there are a heater probe method, a microwave method, a high-frequency method, and an argon plasma coagulation method. The ulcer model according to this embodiment is particularly suitable for practicing hemorrhage arrest by a heater probe method, a microwave method, or a high-frequency method. In particular, the ulcer model having the model main body that is the molded body of the aqueous polyvinyl alcohol-based material is suitable for practicing hemorrhage arrest by a thermocoagulation method. The reason for this is that the thermocoagulation behavior of the aqueous polyvinyl alcohol-based material is very similar to the behavior of an actual human tissue.

Therefore, in the case of using a thermocoagulation method as the endoscopic hemostasis, the whole model main body 10 or the molded body, which forms the outlet opening 5b of the simulated blood vessel path 5 or a portion including a directly upper portion of the outlet opening, of the simulated ulcer surface S20 (for example, the base portion 10a in the ulcer model 101, 102, 103, or 106, the model main body 10 in the ulcer model 104, 105, or 108, or the simulated ulcer portion 10c in the ulcer model 107) may be formed from an aqueous polyvinyl alcohol-based material.

In the case of using a thermocoagulation method as the endoscopic hemostasis, as in the ulcer model 107, the model main body 10 may have the simulated ulcer portion 10c, the simulated ulcer portion 10c may be a molded body formed from an aqueous polyvinyl alcohol-based material, and portions other than the model main body 10, for example, the base portion 10a and the raised portion 10b may be molding formed from a hydrocarbon-based resin material.

The reason for this is that a hydrocarbon-based resin material having high storage stability, durability, and shape reproducibility is particularly suitable for forming the base portion 10*a* and the raised portion 10*b* and an aqueous polyvinyl alcohol-based material suitable for practicing a thermocoagulation method as the endoscopic hemostasis is particularly suitable for forming the simulated ulcer portion 10*c*.

REFERENCE SIGNS LIST

5: simulated blood vessel path, 5*a*: inlet opening, 5*b*: outlet opening, 10: model main body, 10E: outer edges of upper surface and lower surface, 10H: apex of raised surface, 10*a*: base portion, 10*b*: raised portion, 10*c*: simulated ulcer portion, 21: projection, 30: syringe, 41: mold, 35: tube, 43: wire, 45: cavity, 101, 102, 103, 104, 105, 106, 107, 108, 109: ulcer model, S1: upper surface, S2: lower surface, S10: raised surface, S11: outer peripheral side surface, S12: inner peripheral side surface, S20: simulated ulcer surface.

The invention claimed is:

1. An ulcer model used to practice a procedure including hemorrhage arrest, the ulcer model comprising:
a model main body that includes an upper surface, a lower surface, and a tubular simulated blood vessel path provided between the upper surface and the lower surface and having an inlet opening and an outlet opening,
wherein the upper surface includes a ring-shaped raised surface that rises in a thickness direction of the model main body and a simulated ulcer surface that is a recessed bottom surface surrounded by the raised surface,
wherein the simulated blood vessel path extends from a part other than the upper surface of the surfaces of the model main body to the simulated ulcer surface or an area in a vicinity of the simulated ulcer surface,
wherein the outlet opening of the simulated blood vessel path reaches to the simulated ulcer surface, or the outlet opening of the simulated blood vessel path is disposed in the vicinity of the simulated ulcer surface without reaching to the simulated ulcer surface,
wherein the model main body comprises a plate-shaped base portion including the simulated ulcer surface, and a raised portion provided on the base portion and forming the raised surface,
wherein the model main body further includes an outer peripheral side surface continuously connecting outer edges of the upper surface and the lower surface,
wherein the simulated blood vessel path extends inside of the base portion of the model main body,
wherein the inlet opening of the simulated blood vessel path is provided in the outer peripheral side surface of the model main body or the vicinity thereof, or provided to protrude to an outside of the model main body on the outer peripheral side surface side, and
wherein the plate-shaped base portion is flat.

2. The ulcer model according to claim 1, wherein the procedure including hemorrhage arrest is an endoscopic hemostasis.

3. The ulcer model according to claim 1, wherein the hemorrhage arrest is hemorrhage arrest by gripping the simulated ulcer surface with a hemostatic forceps or a clip.

4. The ulcer model according to claim 1, wherein the hemorrhage arrest is hemorrhage arrest by a thermocoagulation method.

5. The ulcer model according to claim 1, wherein the model main body includes a molded body having an E hardness of 5 to 70.

6. The ulcer model according to claim 1, wherein the model main body includes a molded body of an aqueous polyvinyl alcohol-based material.

7. The ulcer model according to claim 1, wherein the model main body includes a molded body of a hydrocarbon-based resin material containing a lipophilic resin and oil.

8. The ulcer model according to claim 1, wherein the model main body includes a molded body of an aqueous polyvinyl alcohol-based material which forms at least a part of the simulated ulcer surface.

9. The ulcer model according to claim 1, wherein the outlet opening of the simulated blood vessel path reaches to the simulated ulcer surface.

10. The ulcer model according to claim 1, wherein the outlet opening of the simulated blood vessel path is disposed in the vicinity of the simulated ulcer surface without reaching to the simulated ulcer surface.

11. An ulcer model used to practice a procedure including hemorrhage arrest, the ulcer model comprising:
a model main body that includes an upper surface, a lower surface, and a tubular simulated blood vessel path provided between the upper surface and the lower surface and having an inlet opening and an outlet opening,
wherein the upper surface includes a ring-shaped raised surface that rises in a thickness direction of the model main body and a simulated ulcer surface that is a recessed bottom surface surrounded by the raised surface,
wherein the simulated blood vessel path extends from a part other than the upper surface of the surfaces of the model main body to the simulated ulcer surface or an area in a vicinity of the simulated ulcer surface,
wherein the outlet opening of the simulated blood vessel path reaches to the simulated ulcer surface, or the outlet opening of the simulated blood vessel path is disposed in the vicinity of the simulated ulcer surface without reaching to the simulated ulcer surface, and
wherein the model main body includes:
a molded body of an aqueous polyvinyl alcohol-based material which forms at least a part of the simulated ulcer surface; and
a molded body of a hydrocarbon-based resin material containing a lipophilic resin and oil.

12. An ulcer model used to practice a procedure including hemorrhage arrest, the ulcer model comprising:
a model main body that includes an upper surface, a lower surface, and a tubular simulated blood vessel path provided between the upper surface and the lower surface and having an inlet opening and an outlet opening,
wherein the upper surface includes a ring-shaped raised surface that rises in a thickness direction of the model main body and a simulated ulcer surface that is a recessed bottom surface surrounded by the raised surface,
wherein the simulated blood vessel path extends from a part other than the upper surface of the surfaces of the model main body to the simulated ulcer surface or an area in a vicinity of the simulated ulcer surface, and
wherein the model main body includes:
a molded body of an aqueous polyvinyl alcohol-based material which forms at least a part of the simulated ulcer surface; and a molded body of a hydrocarbon-based resin material containing a lipophilic resin and oil.

* * * * *